United States Patent [19]

Ohya et al.

[11] Patent Number: 5,259,210
[45] Date of Patent: Nov. 9, 1993

[54] REFRIGERATING APPARATUS AND METHOD OF CONTROLLING REFRIGERATING APPARATUS IN ACCORDANCE WITH FUZZY REASONING

[75] Inventors: Satoshi Ohya, Oura; Hiroshi Taniguchi, Oizumi; Hiroshi Tamayama, Oura, all of Japan

[73] Assignee: Sanyo Electric Co., Ltd., Osaka, Japan

[21] Appl. No.: 803,493

[22] Filed: Dec. 2, 1991

[30] Foreign Application Priority Data

Jan. 10, 1991 [JP] Japan .................................. 3-001610
Jan. 10, 1991 [JP] Japan .................................. 3-001611
Jul. 4, 1991 [JP] Japan .................................. 3-164461

[51] Int. Cl.$^5$ ............................................. F25B 41/00
[52] U.S. Cl. ................................. 62/212; 236/78 D; 395/61
[58] Field of Search ............... 236/78 D; 395/61, 900; 62/212, 225

[56] References Cited

U.S. PATENT DOCUMENTS 5,043,862 8/1991 Takahashi et al. ............. 395/900 X

OTHER PUBLICATIONS

Procyk et al., A Linguistic Self-Organizing Process Controller, 1979.
Rule-Based Self-Organizing Controller, Sugiyama 1988 pp. 341-353.
Fuzzy Pid Supervisor, Lemke et al., 1985 pp. 602-608.

Primary Examiner—William E. Wayner
Attorney, Agent, or Firm—Darby & Darby

[57] ABSTRACT

A refrigerating apparatus which is capable of accurate and swift correspondence to a transient change of a refrigerant circuit or an accumulated deviation of the degree of superheat of a refrigerant, thereby releasing the state in which the liquid refrigerant is flowing back to the compressor and the overheated state, and a method of controlling such a refrigerating apparatus. The refrigerating apparatus comprises a refrigerant circuit composed of a condenser, an expansion valve and an evaporator which are connected to each other in series, a means for detecting the evaporating temperature of the refrigerant, a means for detecting the exit temperature of the evaporator, and a control means for controlling the opening of the expansion valve on the basis of the evaporating temperature of the refrigerant and the exit temperature of the evaporator in accordance with a fuzzy reasoning.

13 Claims, 9 Drawing Sheets

CLOSING OPERATION — OPENING OPERATION

CLOSING OPERATION — OPENING OPERATION

CLOSING        OPENING
OPERATION      OPERATION

CLOSING        OPENING
OPERATION      OPERATION

REFRIGERATING APPARATUS AND METHOD OF CONTROLLING REFRIGERATING APPARATUS IN ACCORDANCE WITH FUZZY REASONING

BACKGROUND OF THE INVENTION

1. Field of the Invention

The present invention relates to a refrigerating apparatus which is adapted to refrigerating machines and equipments such as air conditioners, refrigerators, freezers, show-cases equipped with a freezer or a refrigerator so as to control the degree of superheat and a method of controlling such a refrigerating apparatus in accordance with a fuzzy reasoning, i.e., fuzzy logic.

In conventional refrigerating apparatuses of this type, an expansion valve which is driven and the opening of which is controlled by a pulse motor is provided between a condenser and an evaporator in a refrigerant circuit, and the opening of the expansion valve is so controlled as to keep the degree of superheat constant which is obtained from the difference between the temperature at which the refrigerant is evaporated by the evaporator and the exit temperature of the evaporator, thereby preventing the liquid refrigerant from flowing back to the compressor, as described in, for example, U.S. Pat. Nos. 4,674,292 and 4,745,767.

In the controlling methods described in the above-described specifications, what is called a PID control system is adopted. The PID control system consists of P control for controlling the deviation of the measured degree of superheat from the preset degree of superheat so as to cancel it by an output which is proportional to the deviation, D control for controlling the deviation so as to cancel it on the basis of a change of the deviation, namely, the differential coefficient of the deviation, and I control for controlling the deviation so as to cancel it on the basis of the accumulation of the deviation, namely, the integrated value of the deviation.

Such a PID control system is defective in that PID control cannot follow well a transient change, especially, after the defrosting of the evaporator, which causes the liquid refrigerant to flow back to the compressor or prolongs the overheated state. To prevent this, a measure of making the proportional constant variable is taken. In this case, however, the control becomes so sensitive that the controlling stability is deteriorated.

SUMMARY OF THE INVENTION

Accordingly, it is an object of the present invention to eliminate the above-described problems in the prior art and to provide a refrigerating apparatus which is capable of accurate and swift correspondence to a transient change of a refrigerant circuit and a method of controlling such a refrigerating apparatus.

It is another object of the present invention to provide a refrigerating apparatus which is capable of accurate and swift correspondence to not only a transient change of a refrigerant circuit but also the accumulation of a deviation of the degree of superheat of the refrigerant and a method of controlling such a refrigerating apparatus.

BRIEF DESCRIPTION OF INVENTION

To achieve this aim, in one aspect of the present invention, there is provided a refrigerating apparatus comprising a refrigerant circuit composed of a condenser, an expansion valve and an evaporator which are connected to each other in series, a means for detecting the evaporating temperature of the refrigerant, a means for detecting the exit temperature of the evaporator, and a control means for controlling the opening of the expansion valve on the basis of the evaporating temperature of the refrigerant and the exit temperature of the evaporator in accordance with fuzzy logic reasoning.

In another aspect of the present invention, there is provided a refrigerating apparatus comprising a refrigerant circuit composed of a compressor, a condenser, an expansion valve and an evaporator which are connected to each other in series, a means for detecting the evaporating temperature of the refrigerant, a means for detecting the exit temperature of the evaporator, and a control means for controlling the opening of the expansion valve on the basis of the evaporating temperature of the refrigerant and the exit temperature of the evaporator in accordance with a fuzzy logic reasoning which uses the deviation of the degree of superheat of the refrigerant circuit and a value corresponding to the differential coefficient of the deviation as input variables.

In still another aspect of the present invention, there is provided a refrigerating apparatus comprising a refrigerant circuit composed of a compressor, a condenser, an expansion valve and an evaporator which are connected to each other in series, a means for detecting the evaporating temperature of the refrigerant, a means for detecting the exit temperature of the evaporator, and a control means for controlling the opening of the expansion valve on the basis of the evaporating temperature of the refrigerant and the exit temperature of the evaporator in accordance with a fuzzy logic reasoning which uses the deviation of the degree of superheat of the refrigerant circuit, a value corresponding to the integrated value of the deviation and a value corresponding to the differential coefficient of the deviation as input variables.

In a further aspect of the present invention, there is provided a method of controlling a refrigerating apparatus comprising the steps of preparing a plurality of fuzzy logic production rules with the membership functions using the deviation of the degree of superheat of a refrigerant circuit as an input variable A and the differential coefficient of the deviation as an input variable C, obtaining the membership values corresponding to the respective input variables from the membership functions which correspond to the respective input variables, compounding the output variables Y of the fuzzy logic production rules, and obtaining the result of the reasoning from the center of the gravity of the composition so as to utilize the result as an output for controlling the opening of the expansion valve which is connected to the entrance of the evaporator.

In a still further aspect of the present invention, there is provided a method of controlling a refrigerating apparatus comprising the steps of preparing a plurality of fuzzy logic production rules with the membership functions using the deviation of the degree of superheat of a refrigerant circuit as an input variable A, the integrated value of the deviation as an input variable B and the differential coefficient of the deviation as an input variable C, obtaining the membership values corresponding to the respective input variables from the membership functions which correspond to the respective input variables, compounding the output variables Y of the fuzzy logic production rules, and obtaining the result of the reasoning from the center of the gravity of the composition so as to utilize the result as an output for controlling the opening of the expansion valve which is connected to the entrance of the evaporator.

A refrigerating apparatus according to the present invention is capable of corresponding to a change of the degree of superheat accurately and swiftly. It is also capable of dealing with the accumulated deviation of the degree of superheat and swiftly and appropriately stopping the liquid refrigerant from flowing back to the compressor and bringing the overheat to an end.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
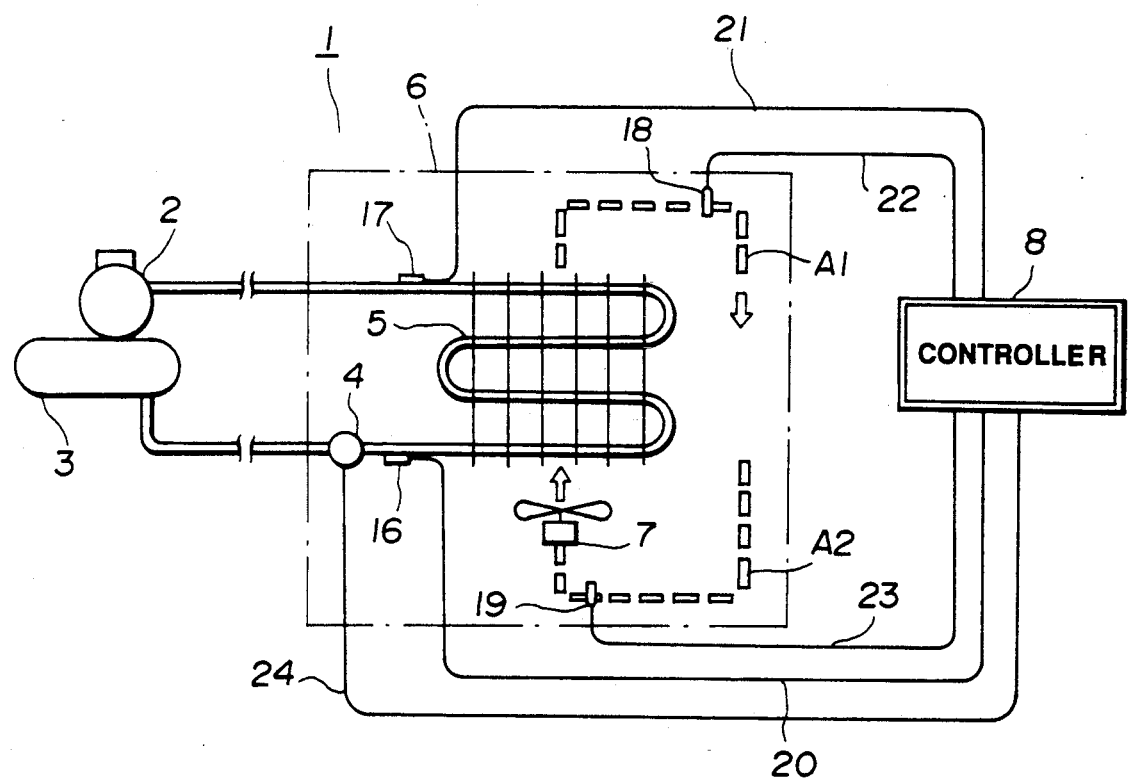
FIG. 1 is a circuit diagram of the refrigerant of a refrigerating apparatus according to the present invention.

Referring first to FIG. 1, which is a circuit diagram of the refrigerant of a refrigerating apparatus 1, the refrigerating apparatus 1 is composed of a compressor 2, a condenser 3, an expansion valve 4, an evaporator 5 which are connected in series by a pipe, thereby constituting a known freezing cycle in which the refrigerant is compressed, condensed for liquefaction, expanded under a reduced pressure and evaporated. The space 6 surrounded by an alternate long and short dash line represents a space to be cooled by the chilled air which has been subjected to heat exchange by use of the evaporator 5. The refrigerating apparatus 1 is also provided with a fan 7 for forcibly circulating chilled air A1 which is supplied from the evaporator 5 and chilled air A2 which is returned to the evaporator 5.

Figure 2:
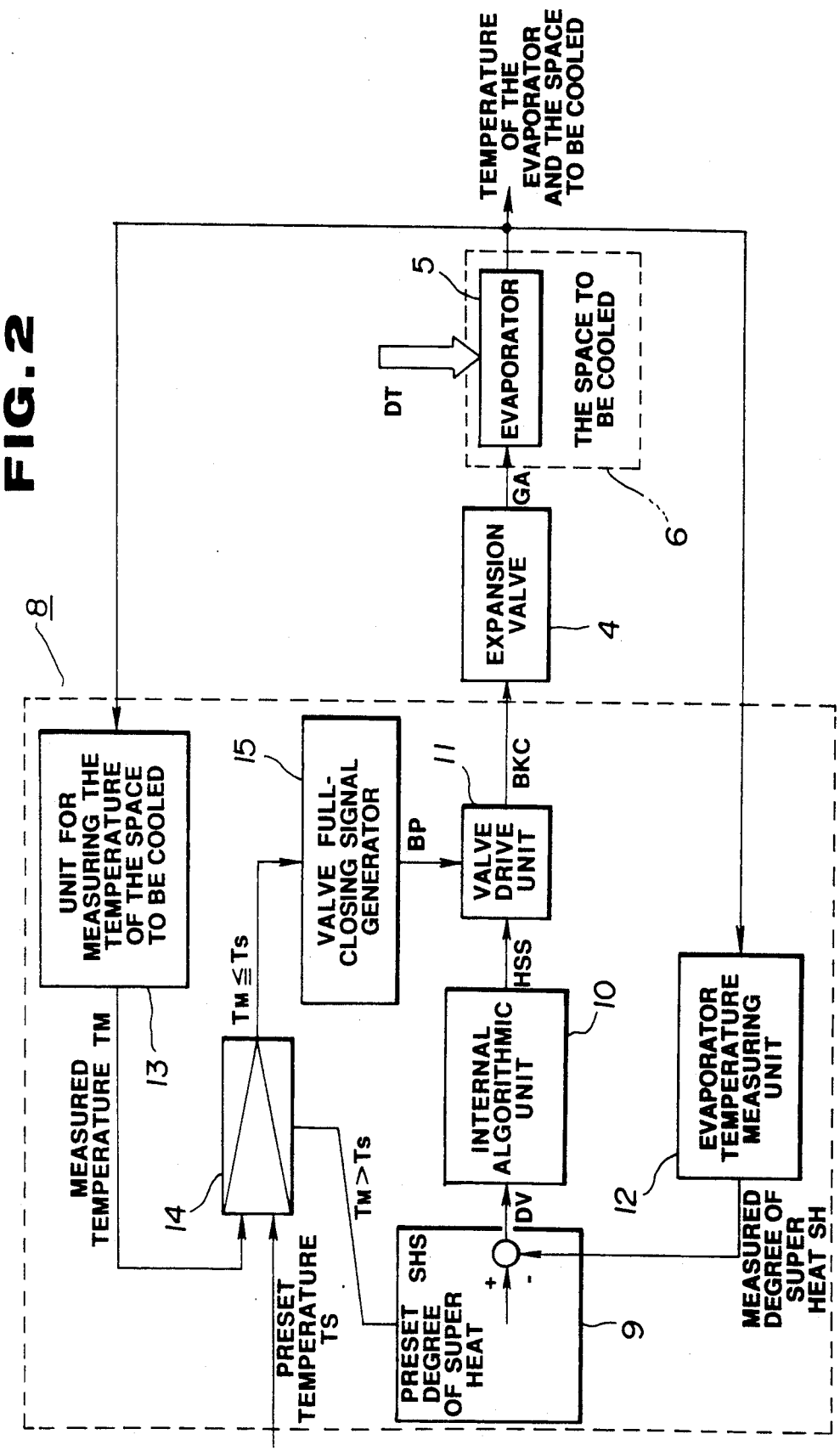
FIG. 2 is a block diagram of a controller.

The reference numeral 8 denotes a controller for controlling the opening and closing operation of the expansion valve 4. The controller 8 is composed of a first comparator 9 for comparing the preset degree of superheat as the target value with a feedback signal, an internal algorithmic unit 10 which functions as an adjuster, a valve drive unit 11 which functions as a final control element, an evaporator temperature measuring unit 12 for detecting the temperature of the evaporator 5, a unit 13 for measuring the temperature of the space to be cooled, a second comparator 14 for comparing the preset temperature with the measured temperature, and a valve full-closing signal generator 15, as shown in FIG. 2.

A first sensor 16 for measuring the entrance temperature of the evaporator 5, a second sensor 17 for measuring the exit temperature of the evaporator 5, a third sensor 18 for measuring the temperature of the supplied chilled air A1 and a fourth sensor 19 for measuring the temperature of the returned chilled air A2 are connected to the controller 8 through respective signal lines 20 to 24.

Figure 3:
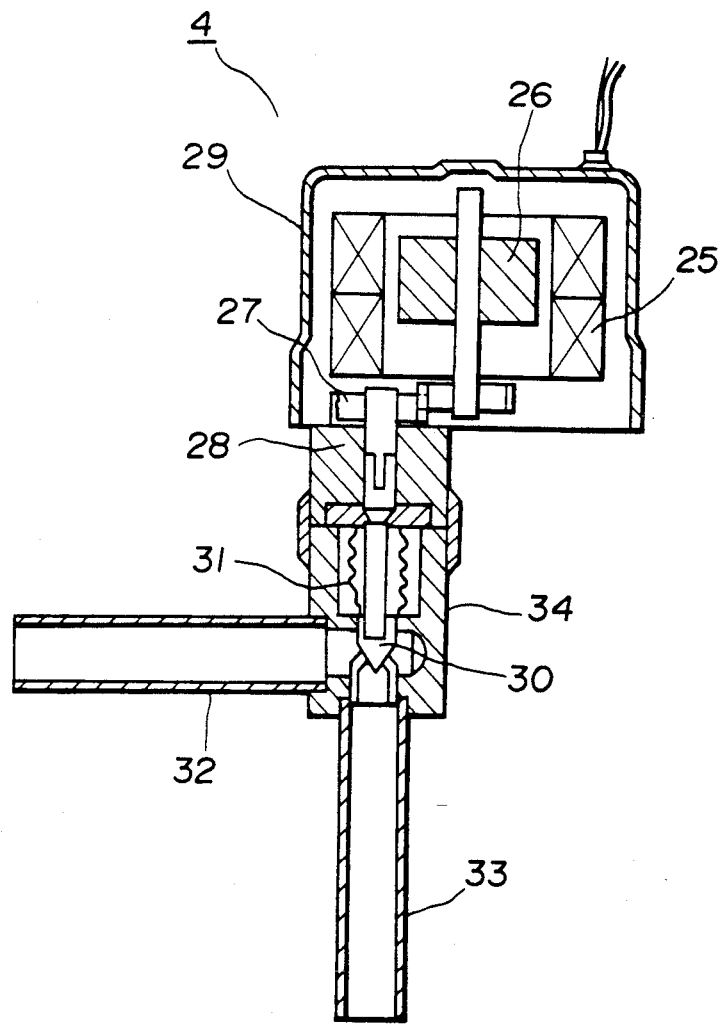
FIG. 3 is a vertical sectional view of an expansion valve.

As the expansion valve 4, a pulse-driven electric valve shown in FIG. 3 is used. The expansion valve 4 is composed of a pulse motor 29 including a coil 25, a rotor 26, a gear 27 and a drive shaft 28, and a valve body 34 including a valve unit 30 which is pressed by the drive shaft 28, bellows 31, a refrigerant entrance pipe 32 and a refrigerant exit pipe 33. The pulse motor 29 is driven in accordance with a valve opening adjusting signal (pulse signal) which is supplied from the valve drive unit 11 so as to keep an appropriate opening.

The opening and closing operation of the expansion valve 4 will now be explained.

In FIG. 2, the symbol SHS represents a preset degree of superheat, SH represents the measured degree of superheat which is calculated from [ST−ET], wherein ST represents the exit temperature of the evaporator 5 and ET represents the temperature of the refrigerant at the entrance or the middle of the evaporator 5, namely, the evaporating temperature of the refrigerant, DV represents a deviation calculated from [SH−SHS], HSS represents an adjustment signal for correcting the deviation in accordance with later-described fuzzy control, and BKC represents a valve opening adjustment signal for controlling the manipulated variable in accordance with the adjustment signal, in other words, supplying pulses for opening or closing the expansion valve 4. The symbol GA represents a flow rate of the refrigerant as a manipulated variable, the pressure of the refrigerant being reduced by the expansion valve 4, DT an external disturbance to the evaporator 5 such as a change of the condensing pressure, a change of the temperature or the humidity of outside air, a difference in temperature between the supplied chilled air A1 and the returned chilled air A2 and enthalpy.

The control of the degree of superheat which uses the deviation DV and the change DDV in the deviation, namely, the value corresponding to the differential coefficient of the deviation as inputs will first be explained.

If the preset degree SHS of superheat is assumed to be 5° C., the first comparator 9 compares the preset degree SHS with the measured degree SH of superheat supplied from the evaporator temperature measuring unit 12 and inputs the deviation DV to the internal algorithmic unit 10.

The internal algorithmic unit 10 determines the adjustment signal HSS in accordance with a fuzzy reasoning.

Two input variables, namely input variables (fuzzy variable) of the condition part of the rule (fuzzy variable) are used in the fuzzy logic reasoning. The deviation DV is used as an input variable A, and a change of the deviation during a predetermined period ending at the current sampling time, namely, the value DDV corresponding to the differential coefficient of the deviation is used as an input variable C. As the output variable Y, namely, the output variable of the conclusion part of the rule, the adjustment signal HSS is used.

As the fuzzy label, five labels, namely, PB (positive and big), PM (positive and medium), ZR (zero), NM (negative and medium) and NB (negative and big) are used. As the fuzzy production rules, the following seven rules are adopted. "Positive" means a dry state, while "negative" means a wet state.

The first rule is "If the input variable A is NB and the input variable C is ZR, then Y is NM". The second rule is "If the input variable A is NB and the input variable C is NM, then Y is NB". The third rule is "If the input variable A is NM and the input variable C is ZR, then Y is ZR". The fourth rule is "If the input variable A is ZR and the input variable C is NM, then Y is NM". The fifth rule is "If the input variable A is PM and the input variable C is ZR, then Y is PM". The sixth rule is "If the input variable A is PB and the input variable C is PM, then Y is PB". The seventh rule is "If the input variable A is PB and the input variable C is ZR, then Y is PM".

Each of these rules will be described in detail in the following.

Figure 4:
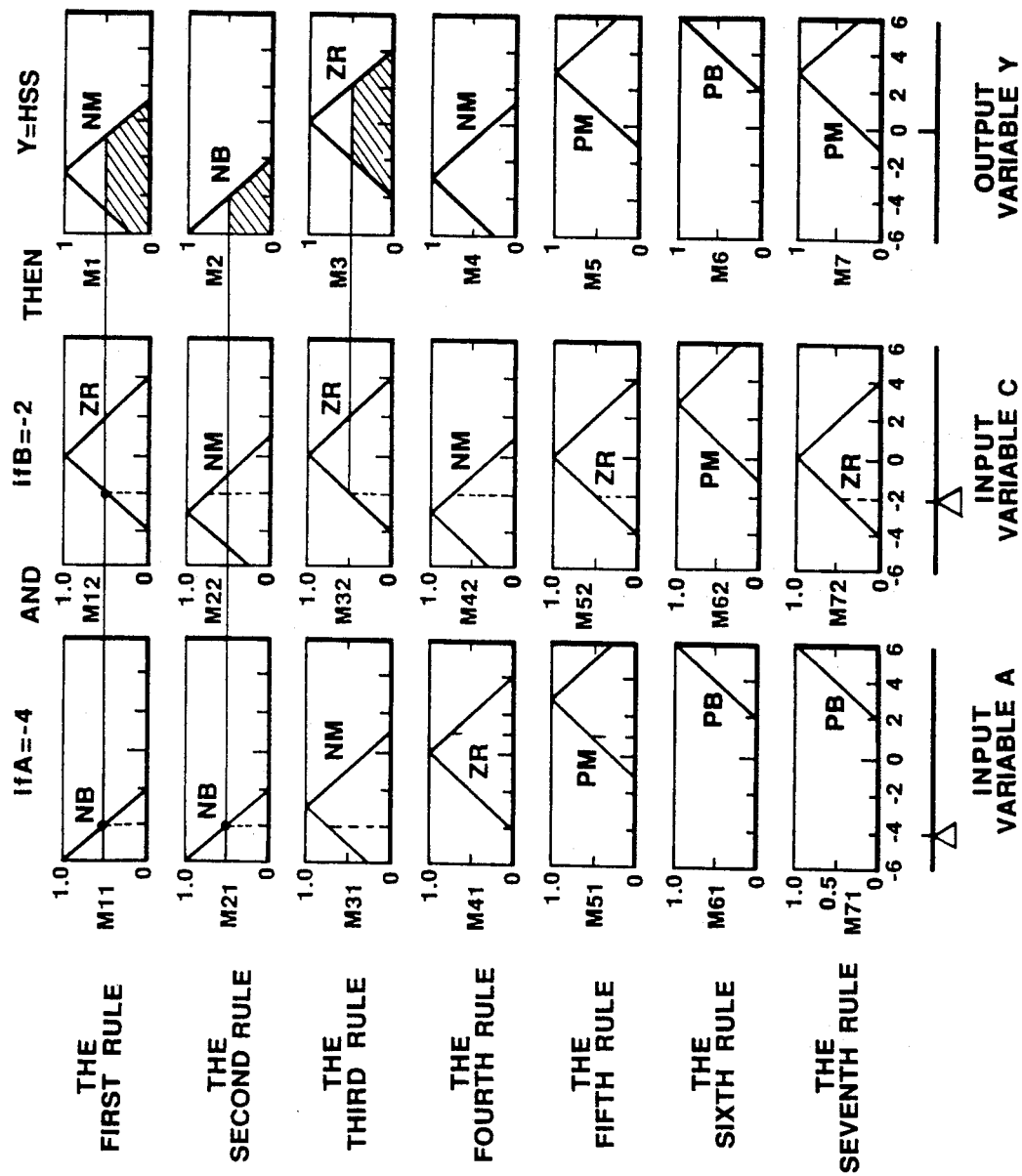
FIG. 4 shows the fuzzy logic production rules of a first embodiment of the present invention, wherein the deviation is used as an input variable A, and a value corresponding to the differential coefficient of a deviation as an input valuable C.

The membership functions of each rule are shown in FIG. 4. The membership function at the left end of each rule shows the degree of closeness of the measured degree SH of superheat to the preset degree SHS of superheat, wherein (−) represents a wet state while (+) represents a dry state, and the deviation DV is used as the input variable A. The membership function at the middle of each rule shows the degree of change of the deviation DV, wherein (−) represents a change of the deviation DV toward a wet state while (+) represents the deviation DV toward a dry state, and the value DDV corresponding to the differential coefficient of the deviation DV is used as the input variable C. The membership function at the right end of each rule shows the degree of opening control of the expansion valve 4 as the conclusion part, which corresponds to HSS, wherein (−) represents control of the valve 4 toward the closing operation while (+) represents control of the valve 4 toward the opening operation.

The first rule shows the certainty factor of the condition that "The refrigerant circuit is in a wet state in which a rather large amount of liquid refrigerant flows back to the compressor 2 and unless there is a change in the deviation of the degree of superheat, the expansion valve 4 is closed a little".

That is, the membership function at the left end forms an inverted V shape which takes the maximum value when the deviation DV of the degree of superheat is −6 (which indicates a rather wet state). By substituting the input variable A into the membership function, the membership value M11 is obtained. The membership function at the central portion forms an inverted V shape which takes the maximum when the value DDV corresponding to the differential coefficient of the deviation is zero. By substituting the input variable C into the membership function, the membership value M12 is obtained. From the membership values M11 and M12, the smaller membership value is selected as the certainty factor M1 of the first rule. The membership function at the right end as the conclusion part forms an inverted V shape which takes the maximum value when the degree of opening control of the expansion valve 4 is −3 (which indicates control of the valve 4 a little toward the closing operation). The area (hatched area) below the certainty factor M1 is output as an adjustment signal HSS1 in the first rule.

The second rule shows the certainty factor of the condition that "The refrigerant circuit is in a wet state in which a rather large amount of liquid refrigerant flows back to the compressor 2 and if there is a small change in the deviation of the degree of superheat toward a wet state, the expansion valve 4 is closed to a rather large extent".

That is, the membership function at the left end forms an inverted V shape which takes the maximum value when the deviation DV of the degree of superheat is −6 (which indicates a rather wet state). By substituting the input variable A into the membership function, the membership value M21 is obtained. The membership function at the central portion forms an inverted V shape which takes the maximum value when the value DDV corresponding to the differential coefficient of the deviation is −3 (which indicates a change a little toward a wet state. By substituting the input variable C into the membership function, the membership value M22 is obtained. From the membership values M21 and M22, the smaller membership value is selected as the certainty factor M2 of the second rule. The membership function at the right end as the conclusion part forms an inverted V shape which takes the maximum value when the degree of opening control of the expansion valve 4 is −6 (which indicates control of the valve 4 rather toward the closing operation). The area (hatched area) below the certainty factor M2 is output as an adjustment signal HSS2 in the second rule.

The third rule shows the certainty factor of the condition that "The refrigerant circuit is in a wet state in which a small amount of liquid refrigerant flows back to the compressor 2 and unless there is a change in the deviation of the degree of superheat, the expansion valve 4 is kept in the current state".

That is, the membership function at the left end forms an inverted V shape which takes the maximum value when the deviation DV of the degree of superheat is −3 (which indicates a little wet state). By substituting the input variable A into the membership function, the membership value M31 is obtained. The membership function at the central portion forms an inverted V shape which takes the maximum value when the value DDV corresponding to the differential coefficient of the deviation is zero. By substituting the input variable C into the membership function, the membership value M32 is obtained. From the membership values M31 and M32, the smaller membership value is selected as the certainty factor M3 of the third rule. The membership function at the right end as the conclusion part forms an inverted V shape which takes the maximum value when the degree of opening control of the expansion valve 4 is 0 (which indicates no control of the valve 4). The area (hatched area) below the certainty factor M3 is output as an adjustment signal HSS3 in the third rule.

The fourth rule shows the certainty factor of the condition that "The degree of superheat of the refrigerant circuit is the preset value and if there is a small change in the deviation of the degree of superheat toward a wet state, the expansion valve 4 is closed a little".

That is, the membership function at the left end forms an inverted V shape which takes the maximum value when the deviation DV of the degree of superheat is zero. By substituting the input variable A into the membership function, the membership value M41 is obtained. The membership function at the central portion forms an inverted V shape which takes the maximum value when the value DDV corresponding to the differential coefficient of the deviation is −3 (which means a change a little toward a wet state). By substituting the input variable C into the membership function, the membership value M42 is obtained. From the membership values M41 and M42, the smaller membership value is selected as the certainty factor M4 of the fourth rule. The membership function at the right end as the conclusion part forms an inverted V shape which takes the maximum value when the degree of opening control of the expansion valve 4 is −3 (which indicates control of the valve 4 a little toward the closing operation). The area (hatched area) below the certainty factor M4 is output as an adjustment signal HSS4 in the fourth rule.

The fifth rule shows the certainty factor of the condition that "The refrigerant circuit is in a little dry state and unless there is a change in the deviation of the degree of superheat, the expansion valve 4 is opened a little".

That is, the membership function at the left end forms an inverted V shape which takes the maximum value when the deviation DV of the degree of superheat is +3 (which indicates a little dry state). By substituting the input variable A into the membership function, the membership value 51 is obtained. The membership function at the central portion forms an inverted V shape which takes the maximum value when the value DDV corresponding to the differential coefficient of the deviation is zero. By substituting the input variable C into the membership function, the membership value M52 is obtained. From the membership values M51 and M52, the smaller membership value is selected as the certainty factor M5 of the fifth rule. The membership function at the right end as the conclusion part forms an inverted V shape which takes the maximum value when the degree of opening control of the expansion valve 4 is +3 (which indicates control of the valve 4 a little toward the opening operation). The area (hatched area) below the certainty factor M5 is output as an adjustment signal HSS5 in the fifth rule.

The sixth rule shows the certainty factor of the condition that "The refrigerant circuit is in a rather dry state and if there is a small change in the deviation of the degree of superheat toward a dry state, the expansion valve 4 is opened to a rather larger extent".

That is, the membership function at the left end forms an inverted V shape which takes the maximum value when the deviation DV of the degree of superheat is +6 (which indicates a rather dry state). By substituting the input variable A into the membership function, the membership value M61 is obtained. The membership function at the central portion forms an inverted V shape which takes the maximum value when the value DDV corresponding to the differential coefficient of the deviation is +3 (which indicates a change a little toward a dry state. By substituting the input variable C into the membership function, the membership value M62 is obtained. From the membership values M61 and M62, the smaller membership value is selected as the certainty factor M6 of the sixth rule. The membership function at the right end as the conclusion part forms an inverted V shape which takes the maximum value when the degree of opening control of the expansion valve 4 is +6 (which indicates control of the valve 4 rather toward the opening operation). The area (hatched area) below the certainty factor M6 is output as an adjustment signal HSS6 in the sixth rule.

The seventh rule shows the certainty factor of the condition that "The refrigerant circuit is in a rather dry state and unless there is a change in the deviation of the degree of superheat, the expansion valve 4 is opened a little".

That is, the membership function at the left end forms an inverted V shape which takes the maximum value when the deviation DV of the degree of superheat is +6 (which indicates a rather dry state). By substituting the input variable A into the membership function, the membership value 71 is obtained. The membership function at the central portion forms an inverted V shape which takes the maximum value when the value DDV corresponding to the differential coefficient of the deviation is zero. By substituting the input variable C into the membership function, the membership value M72 is obtained. From the membership values M71 and M72, the smaller membership value is selected as the certainty factor M7 of the seventh rule. The membership function at the right end as the conclusion part forms an inverted V shape which takes the maximum value when the degree of opening control of the expansion valve 4 is +3 (which indicates control of the valve 4 a little toward the opening operation). The area (hatched area) below the certainty factor M7 is output as an adjustment signal HSS7 in the seventh rule.

The adjustment signals HSS1 to HSS7 obtained in all the rules are compounded by obtaining the weighted mean thereof, and the center of gravity of the composition is obtained as the adjustment signal HSS.

A first embodiment of the present invention which executes the above-described operation will be explained concretely hereinunder.

If it is assumed that the deviation DV is −4 (which indicates a wet state), namely, the input variable A = −4 and DDV is −2 (which indicates a change a little toward a wet state and an enlarging tendency to a wet state), namely, the input variable C = −2, only the membership functions of the first to third rules fit at the end in FIG. 4, and all the membership functions except for the sixth rule fit at the central portion. The membership value M11=0.5, M12=0.5, M21=0.5, M22=0.75, M31=0.75, M32=0.5, M41=0 M42=0.75, M51=0, M52=0.5, M61=M62=0, M71=0 and M72=0.5.

From these membership values, only the first to third rules are obtained as the conclusion of all the rules. In the first rule, the membership values M11=M12=0.5 are selected as M1, and the area below M1=0.5 is obtained as HSS1. In the second rule, the membership value M21=0.5 is selected as M2, and the area below M2=0.5 is obtained as HSS2. In the third rule, the membership value M32=0.5 is selected as M3, and the area below M3=0.5 is obtained as HSS3.

Figure 5:
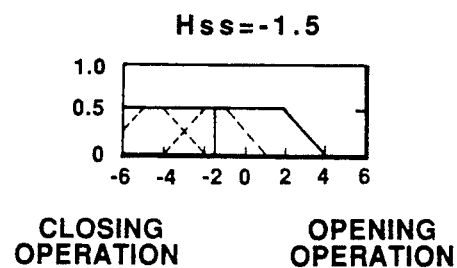
FIG. 5 shows the composition of the outputs of the fuzzy logic production rules in the first embodiment.

The value obtained by superimposing HSS1 to HSS3 is shown in FIG. 5. The center of gravity of the composition is −1.5. Thus, HSS=−1.5 (control of the valve 4 a little toward the closing operation) is determined.

The adjustment signal HSS obtained in this way in accordance with the fuzzy logic reasoning is input to the valve drive unit 11. In accordance with the adjustment signal HSS, the valve drive unit 11 supplies the valve opening adjustment signal BKC for closing the expansion valve 4 by the steps which correspond to −1.5. By reducing the flow rate GA of the refrigerant, the liquid is prevented from flowing back to the compressor 2. The step for the opening or closing of the valve 4 is determined by multiplying an output variable −6 to +6 by 1/200, 1/256 or a multiple of the corresponding resolution.

Figure 6:
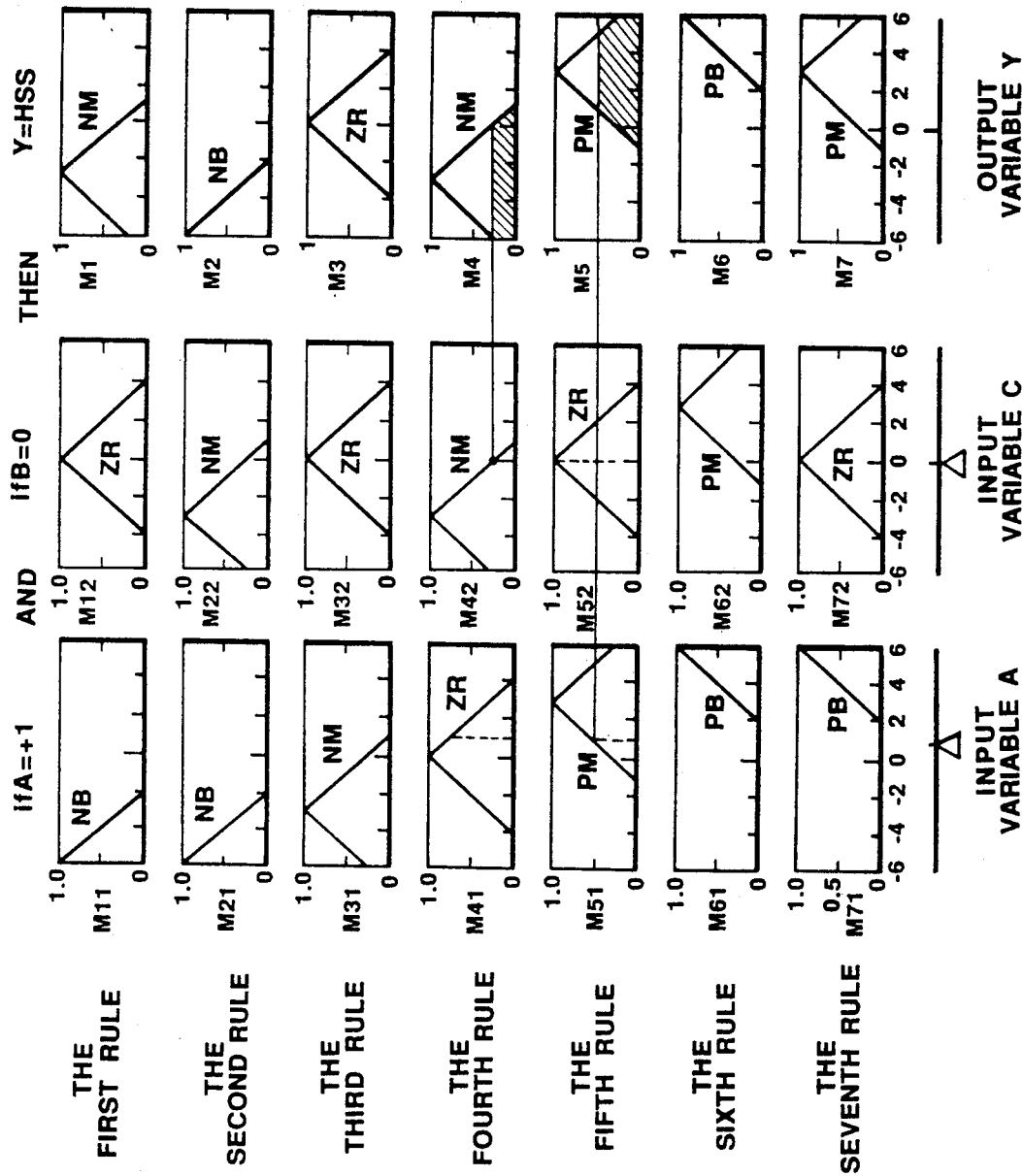
FIG. 6 shows the fuzzy logic production rules of a second embodiment of the present invention, wherein the deviation is used as an input variable A and a value corresponding to the differential coefficient a deviation as an input valuable C.

In a second embodiment of the present invention, it is assumed that the deviation DV is +1 (which indicates a dry state), namely, the input variable A=+1 and DDV is zero (which indicates no change), namely, the input variable C=0, as shown in FIG. 6. Only the membership functions of the fourth and fifth rules fit at the left end, and all the membership functions fit at the central portion. The membership value M11=0, M12=1, M21=0, M22=0.25, M31=0, M32=1, M41=0.75, M42=0.25, M51=0.5, M52=1, M61=0, M62=0.25, M71=0 and M72=−1.

From these membership values, only the fourth and fifth rules are obtained as the conclusion of all the rules. In the fourth rule, the membership value M42=0.25 is selected as M4, and the area below M4=0.25 is obtained as HSS4. In the fifth rule, the membership value M51=0.5 is selected as M5, and the area below M5=0.5 is obtained as HSS5.

Figure 7:
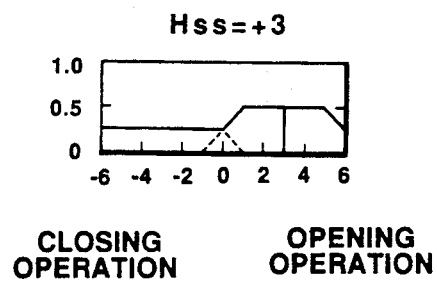
FIG. 7 shows the composition of the outputs of the fuzzy logic production rules in the second embodiment.

The value obtained by superimposing HSS4 to HSS5 is shown in FIG. 7. The center of gravity of the composition is +3. Thus, HSS=+3 (control of the valve 4 toward the opening operation) is determined.

The adjustment signal HSS obtained in this way in accordance with the fuzzy reasoning is input to the valve drive unit 11. In accordance with the adjustment signal HSS, the valve drive unit 11 supplies the valve opening adjustment signal BKC for closing the expansion valve 4 by the steps which correspond to +3. By increasing the opening and, hence, the opening area of the valve 4, flow rate GA of the refrigerant is increased so as to maintain the degree of superheat at the preset degree 5° C. of superheat.

Although the first to seventh rules are set as the fuzzy logic production rules from the result of experiments in the first and second embodiments, the number of rules is not restricted to seven and it may be increased or reduced.

The control of the degree of superheat which uses the deviation DV, the value IDV which corresponds to the integrated value of the deviation and the value DDV which correspond to the differential coefficient of the deviation as inputs will now be explained.

In this case, three input variables (fuzzy variable) of the condition part of the rule are used. The deviation DV is used as an input variable A, the value IDV corresponding to the integrated value of the deviation obtained by integrating the deviation DV over a predetermined period is used as an input variable B, and a change in the deviation from a predetermined sampling period ago to the current time, namely, the value DDV corresponding to the differential coefficient of the deviation is used as an input variable C.

As the output variable Y, namely, the output variable of the conclusion part of the rule, the adjustment signal HSS is used.

As the fuzzy label, five labels, namely, PB (positive and big), PM (positive and medium), ZR (zero), NM (negative and medium) and NB (negative and big) are used. As the inferring rules, the following seven rules are adopted.

The first rule is "If the input variable A is NB and the input variable B is NM and the input variable C is ZR, then Y is NM". The second rule is "If the input variable A is NB and the input variable B is ZR and the input variable C is NM, then Y is NB". The third rule is "If the input variable A is NM and the input variable B is NM and the input variable C is ZR, then Y is ZR". The fourth rule is "If the input variable A is ZR and the input variable B is ZR and the input variable C is NM, then Y is NM". The fifth rule is "If the input variable A is PM and the input variable B is ZR and the input variable C is ZR, then Y is PM". The sixth rule is "If the input variable A is PB and the input variable B is ZR and the input variable C is PM, then Y is PB". The seventh rule is "If the input variable A is PB and the input variable B is C and the input variable C is ZR, then Y is PM".

Each of these rules will be described in detail in the following.

Figure 8:
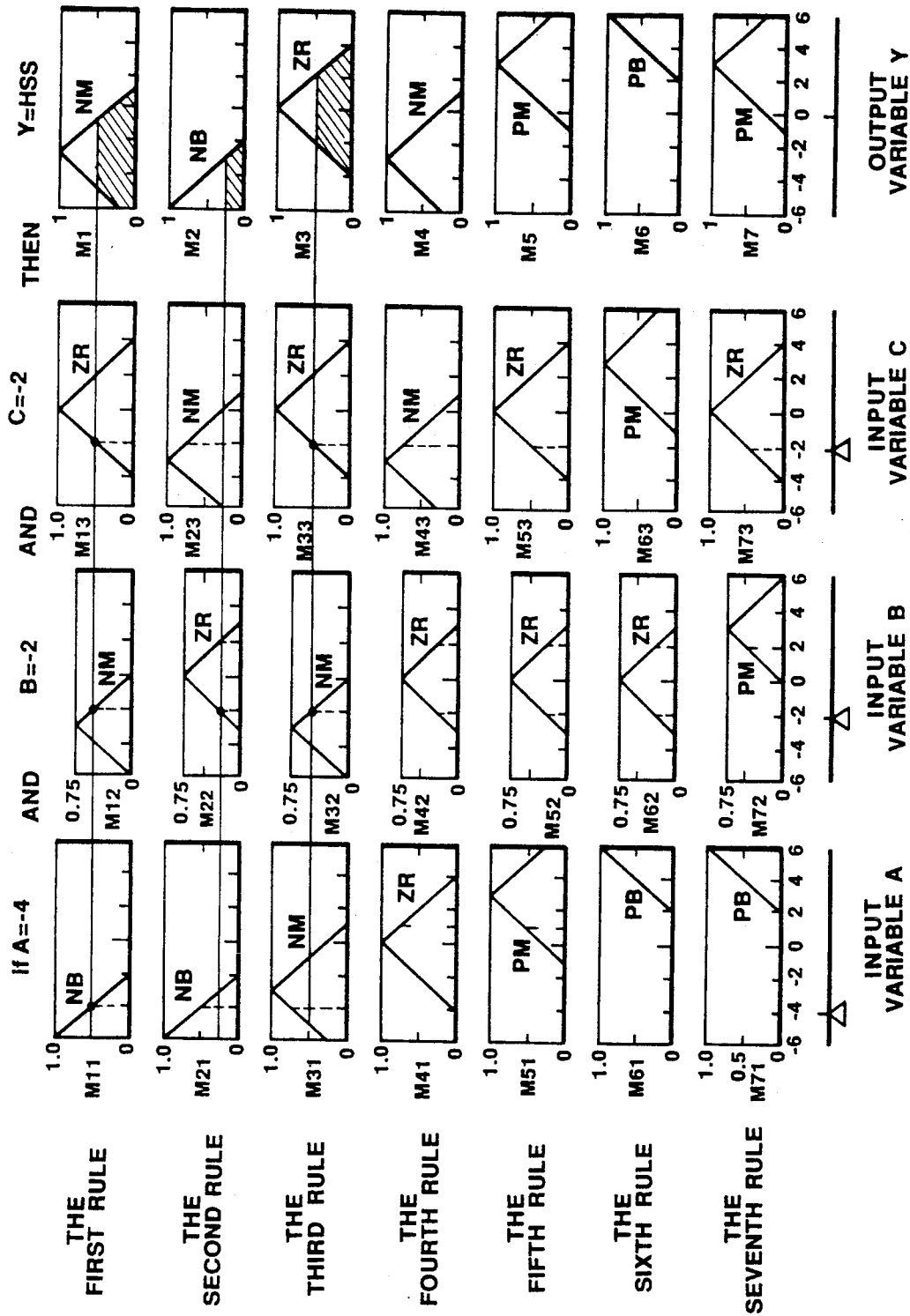
FIG. 8 shows the fuzzy logic production rules of a third embodiment of the present invention, wherein the deviation is used as an input variable A, a value corresponding to the integrated value of a deviation as an input variable B and a value corresponding to the differential coefficient of a deviation as an input valuable C.

The membership functions of each rule are shown in FIG. 8. The membership function at the left end of each rule shows the degree of closeness of the measured degree SH of superheat to the preset degree SHS of superheat, wherein (−) represents a wet state while (+) represents a dry state, and the deviation DV is used as the input variable A. The membership function at the second portion from the left end shows whether a wet state or a dry state is kept, wherein (−) represents a wet state and (+) represents a dry state, and the value IDV corresponding to the integrated value of the deviation obtained by integrating the deviation DV over a predetermined period is used as the input variable B. The membership function at the second portion from the right end shows the degree of change of the deviation DV, wherein (−) represents a change of the deviation DV toward a wet state while (+) represents the deviation DV toward a dry state, and the value DDV corresponding to the differential coefficient of the deviation DV is used as the input variable C. The membership function at the right end of each rule shows the degree of opening control of the expansion valve 4 as the conclusion part, which corresponds to HSS, wherein (−) represents control of the valve 4 toward the closing operation while (+) represents control of the valve 4 toward the opening operation.

The first rule shows the certainty factor of the condition that "The refrigerant circuit is in a wet state in which a rather large amount of liquid refrigerant flows back to the compressor 2 and a little wet state is kept, and unless there is a change in the deviation of the degree of superheat, the expansion valve 4 is closed a little".

That is, the membership function at the left end forms an inverted V shape which takes the maximum value (1) when the deviation DV of the degree of superheat is −6 (which indicates a rather wet state) By substituting the input variable A into the membership function, the membership value M11 is obtained. The membership function at the second portion from the left end forms an inverted V shape which takes the maximum value (0.75) when the IDV corresponding to the integrated value of the deviation is −3 (which indicates that a little wet state is kept). By substituting the input variable B into the membership function, the membership value M12 is obtained. The membership function at the second portion from the right end forms an inverted V shape which takes the maximum value (1) when the value DDV corresponding to the differential coefficient of the deviation is zero. By substituting the input variable C into the membership function, the membership value M13 is obtained. From the membership values M11, M12 and M13, the smallest membership value is selected as the certainty factor M1 of the first rule. The membership function at the right end as the conclusion part forms an inverted V shape which takes the maximum value (1) when the degree of opening control of the expansion valve 4 is −3 (which indicates control of the valve 4 a little toward the closing operation). The area (hatched area) below the certainty factor M1 is output as an adjustment signal HSS1 in the first rule.

The second rule shows the certainty factor of the condition that "The refrigerant circuit is in a wet state in which a rather large amount of liquid refrigerant flows back to the compressor 2 and the value corresponding to the integrated value of the deviation is zero, and if there is a small change in the deviation of the degree of superheat toward a wet state, the expansion valve 4 is closed to a rather large extent".

That is, the membership function at the left end forms an inverted V shape which takes the maximum value (1) when the deviation DV of the degree of superheat is −6 (which indicates a rather wet state). By substituting the input variable A into the membership function, the membership value M21 is obtained. The membership function at the second portion from the left end forms an inverted V shape which takes the maximum value (0.75) when the IDV corresponding to the integrated value of the deviation is zero. By substituting the input variable B into the membership function, the membership value M22 is obtained. The membership function at the second portion from the right end forms an inverted V shape which takes the maximum value (1) when the value DDV corresponding to the differential coefficient of the deviation is −3 (which indicates a change a little toward a wet state. By substituting the input variable C into the membership function, the membership value M23 is obtained. From the membership values M21, M22 and M23, the smallest membership value is selected as the certainty factor M2 of the second rule. The membership function at the right end as the conclusion part forms an inverted V shape which takes the maximum value (1) when the degree of opening control of the expansion valve 4 is −6 (which indicates control of the valve 4 rather toward the closing operation). The area (hatched area) below the certainty factor M2 is output as an adjustment signal HSS2 in the second rule.

The third rule shows the certainty factor of the condition that "The refrigerant circuit is in a wet state in which a small amount of liquid refrigerant flows back to the compressor 2 and a little wet state is kept, and unless there is a change in the deviation of the degree of superheat, the expansion valve 4 is kept in the current state".

That is, the membership function at the left end forms an inverted V shape which takes the maximum value (1) when the deviation DV of the degree of superheat is −3 (which indicates a little wet state). By substituting the input variable A into the membership function, the membership value M31 is obtained. The membership function at the second portion from the left end forms an inverted V shape which takes the maximum value (0.75) when the IDV corresponding to the integrated value of the deviation is −3 (which indicates that a little wet state is kept). By substituting the input variable B into the membership function, the membership value M32 is obtained. The membership function at the second portion from the right end forms an inverted V shape which takes the maximum value (1) when the value DDV corresponding to the differential coefficient of the deviation is zero. By substituting the input variable C into the membership function, the membership value M33 is obtained. From the membership values M31, M32 and M33, the smallest membership value is selected as the certainty factor M3 of the third rule. The membership function at the right end as the conclusion part forms an inverted V shape which takes the maximum value (1) when the degree of opening control of the expansion valve 4 is 0 (which indicates no control of the valve 4). The area (hatched area) below the certainty factor M3 is output as an adjustment signal HSS3 in the third rule.

The fourth rule shows the certainty factor of the condition that "The degree of superheat of the refrigerant circuit is the preset value and the value corresponding to the integrated value of the deviation is zero, and if there is a small change in the deviation of the degree of superheat toward a wet state, the expansion valve 4 is closed a little".

That is, the membership function at the left end forms an inverted V shape which takes the maximum value (1) when the deviation DV of the degree of superheat is zero. By substituting the input variable A into the membership function, the membership value M41 is obtained. The membership function at the second portion from the left end forms an inverted V shape which takes the maximum value (0.75) when the IDV corresponding to the integrated value of the deviation is zero. By substituting the input variable B into the membership function, the membership value M42 is obtained. The membership function at the second portion from the right end forms an inverted V shape which takes the maximum value (1) when the value DDV corresponding to the differential coefficient of the deviation is −3 (which means a change a little toward a wet state). By substituting the input variable C into the membership function, the membership value M43 is obtained. From the membership values M41, M42 and M43, the smallest membership value is selected as the certainty factor M4 of the fourth rule. The membership function at the right end as the conclusion part forms an inverted V shape which takes the maximum value (1) when the degree of opening control of the expansion valve 4 is −3 (which indicates control of the valve 4 a little toward the closing operation). The area (hatched area) below the certainty factor M4 is output as an adjustment signal HSS4 in the fourth rule.

The fifth rule shows the certainty factor of the condition that "The refrigerant circuit is in a little dry state and the value corresponding to the integrated value of the deviation is zero, and unless there is a change in the deviation of the degree of superheat, the expansion valve 4 is opened a little".

That is, the membership function at the left end forms an inverted V shape which takes the maximum value (1) when the deviation DV of the degree of superheat is +3 (which indicates a little dry state). By substituting the input variable A into the membership function, the membership value 51 is obtained. The membership function at the second portion from the left end forms an inverted V shape which takes the maximum value (0.75) when the IDV corresponding to the integrated value of the deviation is zero. By substituting the input variable B into the membership function, the membership value M52 is obtained. The membership function at the second portion from the right end forms an inverted V shape which takes the maximum value (1) when the value DDV corresponding to the differential coefficient of the deviation is zero. By substituting the input variable C into the membership function, the membership value M53 is obtained. From the membership values M51, M52 and M53, the smallest membership value is selected as the certainty factor M5 of the fifth rule. The membership function at the right end as the conclusion part forms an inverted V shape which takes the maximum value (1) when the degree of opening control of the expansion valve 4 is +3 (which indicates control of the valve 4 a little toward the opening operation). The area (hatched area) below the certainty factor M5 is output as an adjustment signal HSS5 in the fifth rule.

The sixth rule shows the certainty factor of the condition that "The refrigerant circuit is in a rather dry state and the value corresponding to the integrated value of the deviation is zero, and if there is a small change in the deviation of the degree of superheat toward a dry state, the expansion valve 4 is opened to a rather large extent".

That is, the membership function at the left end forms an inverted V shape which takes the maximum value (1) when the deviation DV of the degree of superheat is +6 (which indicates a rather dry state). By substituting the input variable A into the membership function, the membership value M61 is obtained. The membership function at the second portion from the left end forms an inverted V shape which takes the maximum value (0.75) when the IDV corresponding to the integrated value of the deviation is zero. By substituting the input variable B into the membership function, the membership value M62 is obtained. The membership function at the second portion from the right end forms an inverted V shape which takes the maximum value (1) when the value DDV corresponding to the differential coefficient of the deviation is +3 (which indicates a change a little toward a dry state. By substituting the input variable C into the membership function, the membership value M63 is obtained. From the membership values M61, M62 and M63, the smallest membership value is selected as the certainty factor M6 of the sixth rule. The membership function at the right end as the conclusion part forms an inverted V shape which takes the maximum value (1) when the degree of opening control of the expansion valve 4 is +6 (which indicates control of the valve 4 rather toward the opening operation). The area (hatched area) below the certainty factor M6 is output as an adjustment signal HSS6 in the sixth rule.

The seventh rule shows the certainty factor of the condition that "The refrigerant circuit is in a rather dry state and a little wet state is kept, and unless there is a change in the deviation of the degree of superheat, the expansion valve 4 is opened a little".

That is, the membership function at the left end forms an inverted V shape which takes the maximum value (1) when the deviation DV of the degree of superheat is +6 (which indicates a rather dry state). By substituting the input variable A into the membership function, the membership value M71 is obtained. The membership function at the second portion from the left end forms an inverted V shape which takes the maximum value (0.75) when the IDV corresponding to the integrated value of the deviation is +3 (which indicates that a little dry state is kept). By substituting the input variable B into the membership function, the membership value M72 is obtained. The membership function at the second portion from the right end forms an inverted V shape which takes the maximum value (1) when the value DDV corresponding to the differential coefficient of the deviation is zero. By substituting the input variable C into the membership function, the membership value M73 is obtained. From the membership values M71, M72 and M73, the smallest membership value is selected as the certainty factor M7 of the seventh rule. The membership function at the right end as the conclusion part forms an inverted V shape which takes the maximum value (1) when the degree of opening control of the expansion valve 4 is +3 (which indicates control of the valve 4 a little toward the opening operation). The area (hatched area) below the certainty factor M7 is output as an adjustment signal HSS7 in the seventh rule.

The adjustment signals HSS1 to HSS7 obtained in all the rules are compounded by obtaining the weighted mean thereof, and the center of gravity of the composition is obtained as the adjustment signal HSS. The maximum values of the membership functions having the input variables A and C, respectively, are 1, while the maximum value of the membership function having the input variable B is as small as 0.75. Therefore, the value IDV corresponding to the integrated value of the deviation is weighted more than the deviation DV and the value DDV corresponding to the differential coefficient of the deviation. In other words, the integrated value constitutes a predominant factor.

A third embodiment of the present invention which executes the above-described operation will be explained concretely hereinunder.

If it is assumed that the deviation DV is −4 (which indicates a wet state), namely, the input variable A=−4, IDV is −2 (which indicates that a little wet state is kept, namely, the input variable B=−2 and DDV is −2 (which indicates a change a little toward a wet state and an enlarging tendency to a wet state), namely, the input variable C=−2, only the membership functions of the first to third rules fit at the left portion in FIG. 8, all the membership functions except for the seventh rule fit at the second portion from the left end and all the membership functions except for the sixth rule fit at the second portion from the right end. The membership value M11=0.5, M12=0.5, M13=0.5, M21=0.5, M22=0.25, M23=0.75, M31=0.75, M32=0.5, M33=0.5, M41=0, M42=0.25, M43=75, M51=0, M52=0.25, M53=0.5, M61=M63=0, M62=0, M62=0.25, M71=M72=0, and M73=0.5.

From these membership values, only the first to third rules are obtained as the conclusion of all the rules. In the first rule, the membership values M11=M12=M13=0.5 are selected as M1, and the area below M1=0.5 is obtained as HSS1. In the second rule, the membership value M22=0.25 is selected as M2, and the area below M2=0.25 is obtained as HSS2. In the third rule, the membership value M32=M33=0.5 is selected as M3, and the area below M3=0.5 is obtained as HSS3.

Figure 9:
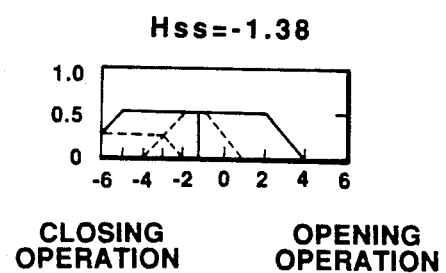
FIG. 9 shows the composition of the outputs of the fuzzy logic production rules in the third embodiment.

The value obtained by superimposing HSS1 to HSS3 is shown in FIG. 9. The center of gravity of the composition is −1.38. Thus, HSS=−1.38 (control of the valve 4 a little toward the closing operation) is determined.

The adjustment signal HSS obtained in this way in accordance with the fuzzy reasoning is input to the valve drive unit 11. In accordance with the adjustment signal HSS, the valve drive unit 11 supplies the valve opening adjustment signal BKC for closing the expansion valve 4 by the steps which correspond to −1.38. By reducing the flow rate GA of the refrigerant, the liquid is prevented from flowing back to the compressor 2. In this embodiment, since the membership value M22 is selected as the certainty factor M2, the degree of closing the valve 4 is smaller than in the case of not using the input variable B. In other words, when only a little wet state is kept (the input variable B=−2), the degree of closing the valve 4 is slightly reduced, thereby minimizing the change in the degree of superheat.

Figure 10:
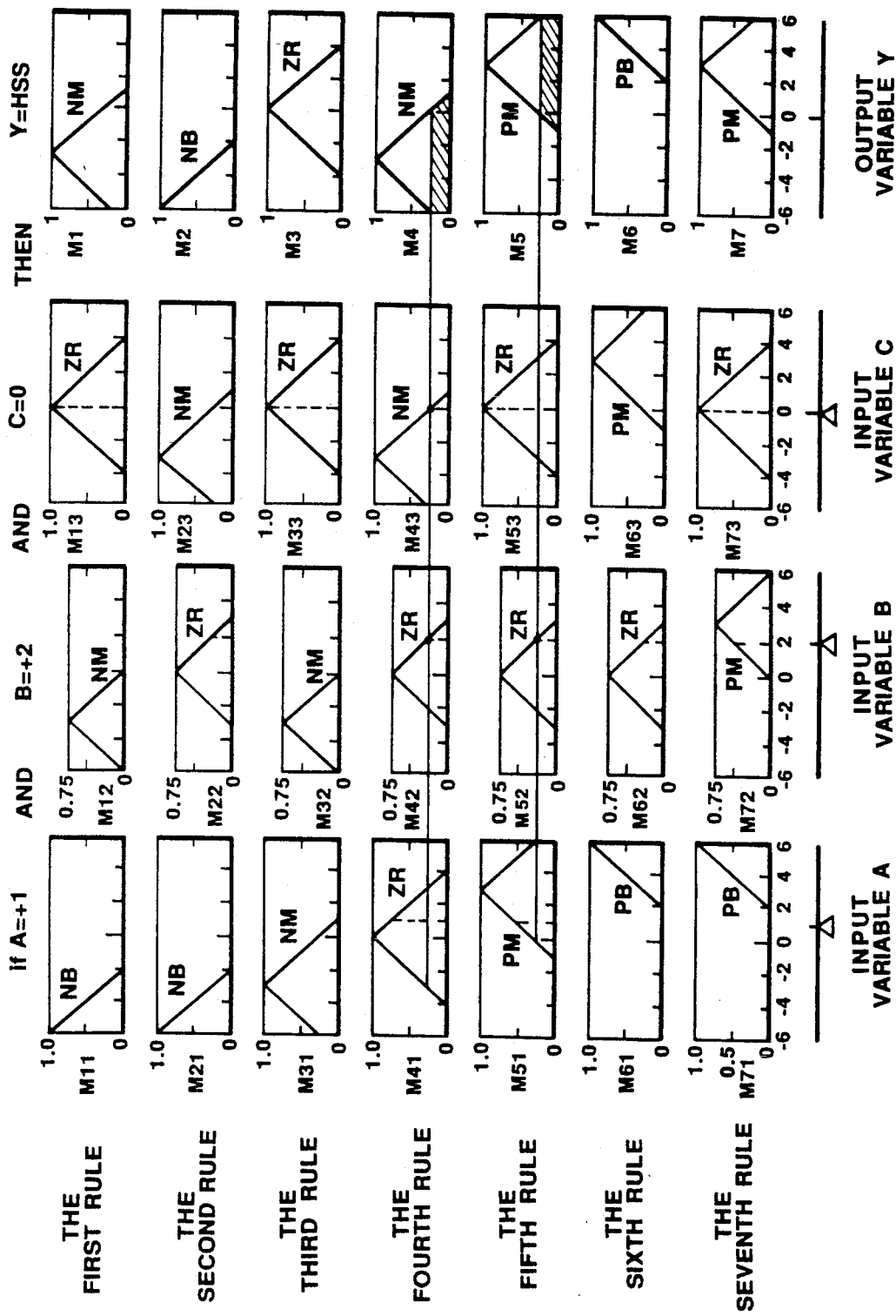
FIG. 10 shows the fuzzy logic production rules of a fourth embodiment of the present invention, wherein the deviation is used as an input variable A, a value corresponding to the integrated value of a deviation as an input variable B and a value corresponding to the differential coefficient of a deviation as an input valuable C.

In a fourth embodiment of the present invention, it is assumed that the deviation DV is +1 (which indicates a dry state), namely, the input variable A=+1), IDV is +2 (which indicates that a little dry state is kept), namely, the input variable B=+2 and DDV is zero (which indicates no FIG. 10. Only the membership functions of the fourth and fifth rules only fit at the left end, the fourth to seventh rules fit at the second portion from the left end and all the membership functions fit at the second portion from the right end. The membership value M11=M12=0, M13=1, M21=M22=0, M23=0.25, M31=M#2=0, M33=1, M41=0.75, M42=M43=0.25, M51=0.5, M52=0.25, M53=1, M61=0, M62=M63=0.25, M71=0 and M72=0.5, M73=1.

From these membership values, only the fourth and fifth rules are obtained as the conclusion of all the rules. In the fourth rule, the membership values M42=M43=0.25 are selected as M4, and the area below M4=0.25 is obtained as HSS4. In the fifth rule, the membership value M52=0.25 is selected as M5, and the area below M5=0.25 is obtained as HSS5.

Figure 11:
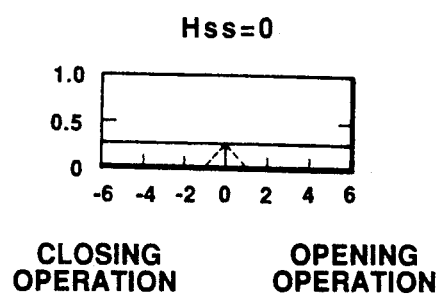
FIG. 11 shows the composition of the outputs of the fuzzy logic production rules in the fourth embodiment.

The value obtained by superimposing HSS4 to HSS5 is shown in FIG. 11. The center of gravity of the composition is 0. Thus, HSS=0 (the opening of the valve 4 is not changed) is determined. In this embodiment, since the membership value M52 is selected as the certainty factor M5, the degree of opening the valve 4 is also smaller than in the case of not using the input variable B (actually, the valve 4 is not opened). In other words, when only a little dry state is kept (the input variable B=+2), the opening of the valve 4 is not changed, thereby minimizing the change in the degree of superheat.

Although the first to seventh rules are set as the fuzzy production rules from the result of experiments in the third and fourth embodiments, the number of rules is not restricted to seven and it may be increased or reduced.

The general temperature control of the space 6 to be cooled which is called thermocycle will here be explained. In FIG. 2, the measured temperature TM is calculated from the mean value of the temperatures of the supplied chilled air A1 and the returned chilled air A2 and compared with the preset temperature TS by the second comparator 14. If a temperature signal indicating TM>TS is output from the second comparator 14, that is, if the measured temperature TM is higher than the preset temperature TS, the above-described control of the degree of superheat is carried out. If a temperature signal indicating TM≦TS is output from thee second comparator 14, that is, if the measured temperature TM is lower than or equal to the preset temperature TS, the temperature control of the space 6 to be cooled is carried out.

When the measured temperature TM of the space 6 to be cooled reaches the preset temperature TS, the second comparator 14 outputs the signal indicating TM≦TS to the valve full-closing signal generator 15. The valve full-closing signal generator 15 then outputs the valve closing signal BP to the valve drive unit 11, whereby the expansion valve 14 assumes the full-closed state and the supply of the refrigerant to the evaporator 5 is stopped.

The full-closed state is kept until the measured temperature TM reaches the upper limit temperature which is higher than the preset temperature TS. When the measured temperature TM reaches the preset temperature TS, the expansion valve 4 is opened again and the above-described opening and closing operation is executed in accordance with the fuzzy reasoning. In this way, the temperature control of the space 6 to be cooled and the control of the degree of superheat of the refrigerant circuit are carried out.

According to the present invention, by applying a fuzzy reasoning to the adjustment of the opening of the expansion valve of a refrigerating apparatus, a refrigerating apparatus is capable of corresponding to a transient change of the refrigerant circuit swiftly and accurately. It is also capable of dealing with the accumulated deviation of the degree of superheat and appropriately suppressing the change of the degree of superheat. The refrigerating apparatus is thus capable of smoothly stopping the liquid refrigerant from flowing back to the compressor and bringing the overheat to an end, thereby improving the reliability.

Especially, since the opening of the expansion valve is controlled on the basis of the deviation of the degree of superheat and the value corresponding to the differential coefficient of the deviation in accordance with a fuzzy reasoning, swift and stable control of the degree of superheat is enabled. Since the control is based on the rules which are determined from experiments, it is only necessary to determine a qualitative relationship, which obviates any formula model. In addition, there are few limits to the determination of the manipulated variable and the control is unlikely to be saturated.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A refrigerating apparatus comprising:
   a refrigerant circuit having a compressor, a condenser, an expansion valve and an evaporator which are connected to each other in series;
   means for detecting the evaporating temperature of the refrigerant;
   means for detecting the exit temperature of the evaporator; and
   control means for producing a variable control adjustment signal for controlling the opening of the expansion valve to correct the deviation of the degree of superheat from a preset value on the basis of the detected evaporating temperature of the refrigerant and the detected exit temperature of the evaporator in accordance with a fuzzy logic reasoning which uses the deviation of the degree of superheat of the refrigerant circuit, a value corresponding to the integrated value of the deviation and a value corresponding to the differential coefficient of the deviation as input variables.

2. A refrigerating apparatus as in claim 1, wherein said control means weights the value corresponding to the integrated value of the deviation more than the deviation and the value corresponding to the differential coefficient of the deviation in the fuzzy logic reasoning.

3. A refrigerating apparatus as in claim 2, wherein the value corresponding to the differential coefficient of the deviation is a change in the deviation from a predetermined sampling period prior to the current time.

4. A refrigerating apparatus as in claim 2, wherein the value corresponding to the differential coefficient of the deviation is a change in the deviation from a predetermine sampling period prior to the current time; and the value corresponding to the integrated value of the deviation is a value obtained by integrating the deviation over a predetermined period.

5. A refrigerating apparatus as in claim 1, wherein the value corresponding to the differential coefficient of the deviation at the current time is a change in the deviation from that of a predetermined sampling period prior to the current time.

6. A refrigerating apparatus as in claim 1, wherein the value corresponding to the differential coefficient of the deviation is a change in the deviation from a predetermine sampling period prior to the current time; and the value corresponding to the integrated value of the deviation over a predetermined period.

7. A method of controlling a refrigerating apparatus having a compressor, a condenser, an expansion valve and an evaporator which are connected to each other in series comprising the steps of:
establishing a plurality of fuzzy logic production rules with the membership functions using the deviation of the degree of superheat from a preset value of a refrigerant circuit as an input variable A and the value corresponding to the differential coefficient of the deviation as an input variable C;
obtaining the membership values corresponding to the respective input variables from the membership functions which correspond to the respective input variables;
compounding the output variables Y of the fuzzy logic production rules; and
obtaining the result of the reasoning from the center of gravity of the composition so as to utilize the result as an adjustment signal for correcting the deviation; and
controlling the opening of the adjustment valve connected to the entrance of the evaporator on the basis of the adjustment signal.

8. A method of controlling a refrigerating apparatus as in claim 7, wherein the value corresponding to the differential coefficient of the deviation is a change in the deviation from a predetermined sampling period prior to the current time.

9. A method of controlling a refrigerating apparatus having a compressor, a condenser, an expansion valve and an evaporator which are connected to each other in series comprising the steps of:
establishing a plurality of fuzzy logic production rules with the membership functions using the deviation of the degree of superheat from a preset value of a refrigerant circuit as an input variable a, the integrated value of the deviation as an input variable B and the value corresponding to the differential coefficient of the deviation as an input variable C;
obtaining the membership values corresponding to the respective input variables from the membership functions which correspond to the respective input variables;
compounding the output variables Y of the fuzzy logic production rules;
obtaining the result of the reasoning from the center of gravity of the composition so as to utilize the result as an adjustment signal for correcting the deviation; and
controlling the opening of the adjustment valve connected to the entrance of the evaporator on the basis of the adjustment signal.

10. A method of controlling a refrigerating apparatus as in claim 9, wherein the value corresponding to the integrated value of the deviation is weighted more than the deviation and the value corresponding to the differential coefficient of the deviation in the fuzzy logic reasoning.

11. A method of controlling a refrigerating apparatus as in claim 10, wherein the value corresponding to the differential coefficient of the deviation is a change in the deviation from a predetermined sampling period prior to the current time.

12. A method of controlling a refrigerating apparatus as in claim 10, wherein the value corresponding to the differential coefficient of the deviation is a change in the deviation from a predetermined sampling period prior to the current time; and the value corresponding to the integrated value of the deviation is a value obtained by integrating the deviation over a predetermined period.

13. A method of controlling a refrigerating apparatus as in claim 9, wherein the value corresponding to the differential coefficient of the deviation is a change in the deviation from a predetermined sampling period prior to the current time; and the value corresponding to the integrated value of the deviation is a value obtained by integrating the deviation over a predetermined period.

* * * * *